United States Patent
Gregory

(10) Patent No.: US 9,039,062 B1
(45) Date of Patent: May 26, 2015

(54) TAILGATE ENCLOSURE APPARATUS

(71) Applicant: Shawn Gregory, Cortez, CO (US)

(72) Inventor: Shawn Gregory, Cortez, CO (US)

(73) Assignee: Tuffy Security Products, Inc., Cortez, CO (US)

( * ) Notice: Subject to any disclaimer, the term of this patent is extended or adjusted under 35 U.S.C. 154(b) by 0 days.

(21) Appl. No.: 13/632,969

(22) Filed: Oct. 1, 2012

(51) Int. Cl.
*B60R 5/04* (2006.01)
*B62D 33/03* (2006.01)

(52) U.S. Cl.
CPC .. *B62D 33/03* (2013.01); *B60R 5/04* (2013.01)

(58) Field of Classification Search
CPC ......... B62D 33/03; B62D 33/02; B62D 33/04
USPC ............... 296/37.16, 37.5, 37.6, 193.08, 106, 296/198, 26.11; 224/543; 280/756
IPC ....................................................... B60R 5/04
See application file for complete search history.

(56) References Cited

U.S. PATENT DOCUMENTS

| | | | |
|---|---|---|---|
| 1,947,745 A | 2/1934 | Taylor | |
| 2,767,896 A | 10/1956 | Beck | |
| 2,867,471 A | 1/1959 | Coon, Jr. | |
| 3,393,936 A | 7/1968 | Hall | |
| 4,127,301 A | 11/1978 | Syrowik | |
| 4,215,896 A | 8/1980 | Drouin | |
| 4,262,955 A | 4/1981 | Duda | |
| 4,413,854 A | 11/1983 | Hirshberg | |
| 4,451,075 A | 5/1984 | Canfield | |
| 4,480,675 A | 11/1984 | Berkemeier | |
| 4,506,870 A | 3/1985 | Penn | |
| 4,580,827 A | 4/1986 | Feagan | |
| 4,632,446 A | 12/1986 | Douglass | |
| 4,749,226 A | 6/1988 | Heft | |
| 4,828,312 A | 5/1989 | Kinkel et al. | |
| 4,938,398 A * | 7/1990 | Hallsen | 224/404 |
| 4,938,519 A | 7/1990 | Schlachter | |
| D319,610 S * | 9/1991 | Janke | D12/401 |
| 5,083,828 A | 1/1992 | Accettura | |
| D325,125 S | 4/1992 | Paul | |
| 5,324,089 A | 6/1994 | Schlachter | |
| 5,564,768 A | 10/1996 | Saffold | |
| 5,564,776 A | 10/1996 | Schlachter | |
| D377,004 S | 12/1996 | Timms | |
| 5,598,962 A | 2/1997 | Schlachter | |
| 5,687,895 A | 11/1997 | Allison et al. | |

(Continued)

OTHER PUBLICATIONS

Special Master's Report and Recommendations Regarding Claim Construction, submitted John R. Thomas in U.S. District Court Case *Bestop, Inc. v. Tuffy Security Prod., Inc.*, No. 3-cv-10759-NGE-MJH (E.D. Michigan).

*Primary Examiner* — Pinel Romain
(74) *Attorney, Agent, or Firm* — Ramon L. Pizarro

(57) ABSTRACT

An enclosure device for forming a secured enclosure area within a cargo area of a vehicle is disclosed. The enclosure device includes a front panel and a generally planar deck panel that extends from the front panel. The deck panel includes a pair of pair of spaced apart left and right sides that are adapted for extending over the wheel wells and the sidewalls. The deck panel also includes an aft edge that is adapted for extending to a location directly below an upper lip of the aft end of the cargo area when the front panel is adapted for fastening to the vehicle. At least one of the spaced apart left and right sides includes an abutment edge that is adapted for being positioned next to the sport cage upright, so that the secured enclosure area is created below the deck panel.

9 Claims, 7 Drawing Sheets

(56) References Cited

U.S. PATENT DOCUMENTS

| | | | |
|---|---|---|---|
| 5,853,116 A * | 12/1998 | Schreiner | 224/404 |
| 6,065,794 A | 5/2000 | Schlachter | |
| 6,082,804 A | 7/2000 | Schlachter | |
| 6,113,179 A | 9/2000 | Szigeti | |
| 6,155,625 A | 12/2000 | Felix | |
| 6,170,724 B1 * | 1/2001 | Carter et al. | 224/404 |
| 6,174,012 B1 | 1/2001 | Saffold | |
| 6,305,730 B1 * | 10/2001 | Stone | 296/37.6 |
| 6,435,586 B2 | 8/2002 | Getzschman et al. | |
| 6,561,561 B2 | 5/2003 | Getzschman et al. | |
| 6,568,739 B1 | 5/2003 | Burch | |
| 6,607,228 B2 | 8/2003 | Carter, III et al. | |
| 6,702,355 B1 | 3/2004 | Price et al. | |
| 6,733,060 B1 | 5/2004 | Pavkov et al. | |
| 6,880,875 B2 | 4/2005 | McClure et al. | |
| 6,959,955 B2 | 11/2005 | Carter et al. | |
| 7,226,100 B1 | 6/2007 | Willey et al. | |
| 7,438,338 B1 | 10/2008 | Schumacher et al. | |
| 7,523,977 B2 | 4/2009 | Fallis, III et al. | |
| 7,731,260 B2 | 6/2010 | Heller | |
| 7,815,235 B2 | 10/2010 | Hayashi et al. | |
| 8,002,331 B2 | 8/2011 | Bowers | |
| 8,052,019 B2 | 11/2011 | Plavetich | |
| 8,256,819 B1 | 9/2012 | Gregory | |
| 2007/0284907 A1 | 12/2007 | Yue | |

\* cited by examiner

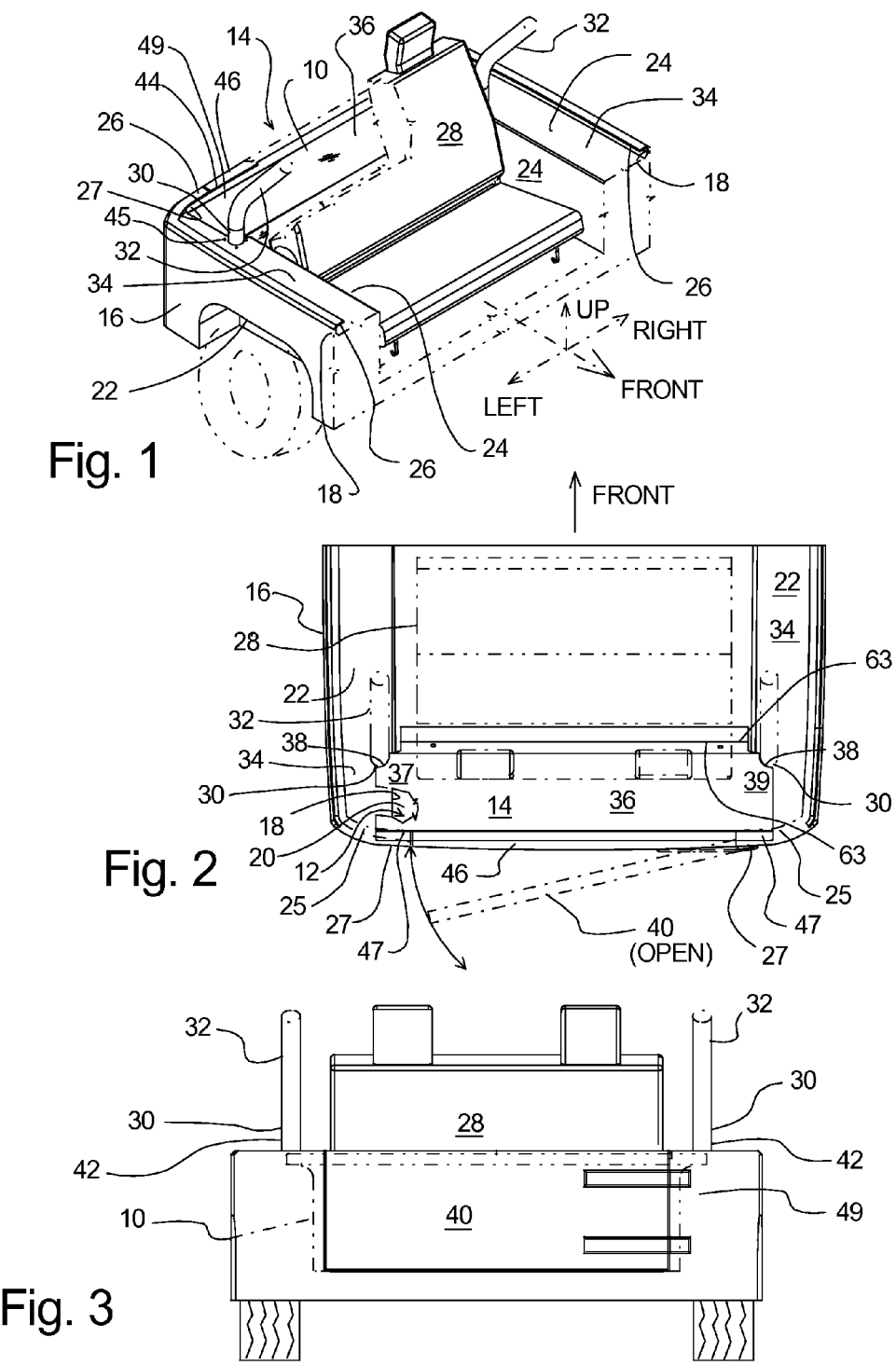

TAILGATE ENCLOSURE APPARATUS

BACKGROUND OF THE INVENTION (a) Field of the Invention

This application relates to a device and method for creating an enclosed space and cargo deck in a vehicle with a locking tailgate. More particularly, but not by way of limitation, to a device and system for creating a lockable storage enclosure and loading deck that takes advantage of the structure found in a sport utility vehicle such as a Jeep® Wrangler®.

(b) Discussion of Known Art

The popular style of sport utility vehicle sold under the trademark Jeep® Wrangler® by the Chrysler® Corporation of Auburn Hills, Mich., is offered with a convertible top, which allows the user to enjoy open-air driving. The removal of the top, or the use of a fabric top, leaves the contents of the vehicle vulnerable to theft. Thus, there is a need for providing a system that allows a user to store items in such a vehicle in a secure manner.

The need for a storage device in the Jeep® convertible vehicle has spawned the creation of devices such as the security enclosure shown in U.S. Pat. No. 4,938,519 to Schlachter, incorporated herein in its entirety by reference, U.S. Pat. No. 6,305,730 to Stone, and U.S. Pat. No. 7,438,338 to Schumacher et al., also incorporated herein in its entirety by reference. However, these approaches have been unable to solve the long-felt need for a device that combines simplicity in mounting the device from the cargo area of the Jeep® convertible vehicle, and which provides the user with a system that can be installed without having to modify the vehicle.

Additionally, leasing has become a very popular approach at obtaining a new vehicle. However, the lessee must return the vehicle to the lessor in its original, stock, condition upon termination of the lease. This presents difficult decisions for the individual who leases a Jeep® convertible vehicle, and who wishes to install a device that creates a secure storage area without permanently altering or modifying the vehicle. Devices such as the enclosure disclosed in U.S. Pat. No. 4,938,519 to Schlachter require that the user secure the device by drilling holes into the body of the vehicle and then driving sheet metal screws through the device into the holes made in the interior panels of the vehicle, which obviously permanently alters the condition of the vehicle.

Still further, devices such as the Schlacter device make inefficient use of the space and structure found in the vehicle. These devices attach to the vertical sides of the wheel wells, and thus necessarily have to incorporate all support structure within the limited space found between the wheel wells.

Accordingly, here remains a need for a device that can be used to create a lockable storage area in the back of a vehicle, such as the Jeep® convertible, and which cooperates with mounting hardware that is found in the vehicle as produced by the manufacturer to produce a secure installation. Still further, there remains a need for a device that takes advantage of factory installed structure, such as the "sport cage" which incorporates uprights and horizontal structure that extends over and to the sides of the passenger areas in order to protect the passengers in the event of a roll-over accident or other features found in the cargo area of the Jeep® convertible. This structure and features are used to form a device that creates a more efficient, reliable, lockable trunk while using fewer components than devices found in the prior art. Still further, it is contemplated that the disclosed invention and related principles may be used to create a secure storage area by cooperating with any sturdy upright component that is fastened to the wheel well or side wall of the cargo area, and which can prevent forward movement the same manner as the sport cage.

There remains a need for a device that creates a lockable storage compartment from the cargo area in the back of a vehicle, such as the Jeep® convertible, and which can be quickly modified to allow the user to restore the storage area to approximately its original unrestricted condition, and thus allowing the user to carry tall or large items that would not fit within the lockable storage area.

Therefore, a review of known devices reveals that there remains a need for a simple device that provides a versatile and secure storage compartment for vehicles having an open cargo area with side panels and a tailgate, such as the cargo area found in a vehicle such as the convertible Jeep® Wrangler® vehicle, a device that can be securely installed without having to drill holes into the vehicle.

SUMMARY

It has been discovered that the problems left unanswered by known art can be solved by providing an enclosure device that uses existing fasteners and fastener holes found in vehicles that have a cargo area with a tailgate and a floor between a pair of wheel wells with vertical wheel well sides, and a roll-bar with uprights mounted from the cargo area such as a Jeep® convertible. A preferred example of the invention includes:

1) A generally planar front panel that is adapted for being supported in an upright or slightly angled manner from the floor of the vehicle. The front panel including tabs or flanges that include apertures or slots that have been adapted for alignment with fastener holes existing in the vehicle;

2) A generally planar deck panel that includes a forward edge that extends from the upper edge of the front panel and ends in an aft edge at a location next to the tailgate when the tailgate is in the closed position, the deck panel having a sport cage upright abutment edge, is positioned next to the sport cage and extends over the wheel well of the vehicle at a location adjacent to the sport cage.

It will be understood from the accompanying drawings and detailed description that the closing of the tailgate of the vehicle will trap the deck panel between the tailgate and the sport cage uprights, or other extensions or detent mechanisms that may be attached to the sport cage uprights or to the wheel well or cargo area structure for the purpose of capturing the top panel at a distance over the floor of the cargo area. The deck panel is attached to the front panel, which prevents access from the front of the vehicle into the storage space created between the deck panel and the floor of the cargo area.

Additionally, it is contemplated that the front panel and the deck panel may be bolted to one another with carriage bolts, installed with the rounded head on the outside of the secured enclosure area created with the disclosed invention, so that the front panel and the deck panel may not be easily separated in order to gain access to the storage space in the secured enclosure area.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is a perspective view of the rear portion of a vehicle with the disclosed invention installed in the cargo area of the vehicle. The figure also shows the directional convention used here.

FIG. 2 is a top, plan, view of the rear of a vehicle, such as a Jeep® Wrangler®-type convertible, and illustrates the use of the disclosed enclosure device installed in the vehicle.

FIG. 3 is a view of the vehicle shown in FIG. 2, the view looking from the rear of the vehicle towards the front of the vehicle, and illustrates the use of the disclosed enclosure device installed in the vehicle.

DETAILED DESCRIPTION OF PREFERRED EXEMPLAR EMBODIMENTS

Figure 4:
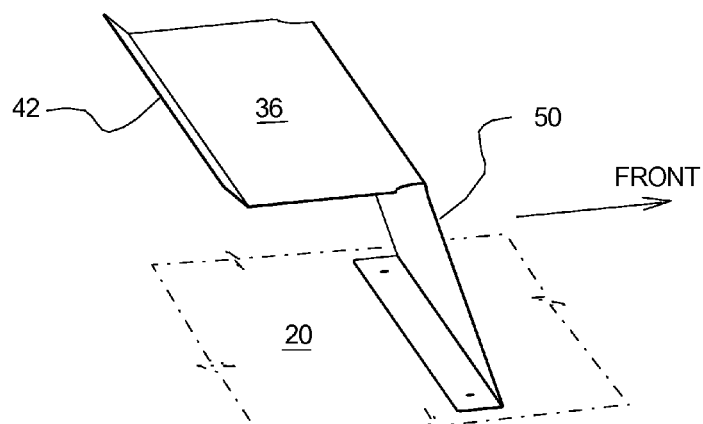
FIG. 4 is a perspective view of a highly simplified example of the disclosed invention, the example being fabricated as a one-piece device of unitary construction.

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIGS. 1 and 2 where an enclosure device 10 for forming a secured enclosure area 12 within the cargo area 14 of a vehicle 16, such as the Jeep® Wrangler® type convertible. The cargo area 14 of the vehicle 16 in this example includes at least two opposing sidewalls 18 and a floor 20 that extends between a pair of wheel wells 22. Each of the wheel wells 22 includes generally vertical wheel well sides 24. Additionally, the opposing sidewalls 18 include an upper lip 26 that extends from the respective sidewall 18 and in, towards the cargo area 14 of the vehicle 16. Additionally the aft end 25 of the cargo area 14 will be bounded by an end wall 27, along which a tailgate 40 is mounted. The end wall 27 also incorporates the upper lip 26, which simply follows the top of the sidewalls 18 on to the top of the end walls 27.

Referring now to FIGS. 2 and 3 it will be understood that the cargo area 14 is enclosed with the disclosed enclosure device 10. Additionally, as shown in FIG. 2 the disclosed invention fits behind the rear seat 28 and cooperates with a discontinuity in the cargo area 14 and particularly with a discontinuity such as the uprights 30 of the sport cage 32 that is attached to the upper surface 34 of the wheel wells 22. Additionally, the disclosed enclosure device 10 includes a generally planar deck panel 36 that has a sport cage upright abutment edge 38. The upright abutment edge 38 has been incorporated at a location along the deck panel 36. The sport cage upright abutment edge 38 is positioned on the deck panel 36 such that the abutment edge 38 will be at a location immediately behind or against the sport cage upright 30 when the disclosed invention is mounted in the vehicle 16. This will allow at least one or preferably both of the uprights 30 to be used to limit the forward movement of the deck panel 36.

It should be noted that the principles taught herein for limiting the forward movement of the deck panel 36 could be used with any suitable internal discontinuity found in the cargo area of the vehicle. The uprights 30 act as a discontinuity, or protrusion, that extends from the cargo area 14, which serves to prevent the forward motion of the deck panel 36. Accordingly, it should be understood it is contemplated that stiffeners or attachments that may have been installed by the OEM in the cargo area 14 of the vehicle may also serve as the discontinuity that prevent forward movement of the deck panel 36. Thus, the abutment edge 38 may cooperate with an internal stiffener, bracket, fastener, or other structure of suitable rigidity that prevents aft movement of the deck panel 36 when contacted by the abutment edge 38.

FIGS. 2 and 3 further illustrate how the sport cage upright abutment edge 38 is sized for positioning in close proximity to the aft surface 42 of the sport cage upright 30. The preferred example of the invention includes an abutment edge 38 on the left side 37 of the deck panel 36 and one on the right side 39 of the deck panel 36. However, it is contemplated that the abutment edge 38 may be incorporated in only one of the two sides of the deck panel 36 in order to carry out the function of preventing the forward movement of the deck panel 36. Such an arrangement would still require that the side of the deck panel 36 that does not include an abutment edge, or an equivalent structure, be supported at the same distance from the floor 20 as the remaining portions of the deck panel 36. Ensuring that the deck panel 36 rests on both wheel wells 22 would do this.

Referring to FIGS. 2, 3 and 4 it will also be understood that the deck panel 36 of the enclosure device 10 is also configured to cooperate with the upper lip 26, or flange 44 of the tailgate 40 to restrict the upward or aft movement of the deck panel 36. The flange 44 extends along the upper edge of the tailgate 40 as well. The lip 26 is found on the perimeter of entire cargo area 14 of the vehicle 16, including from both the upper edges 47 of the aft end 49 of the Jeep® vehicle 16 as manufactured by the Chrysler Group LLC of Auburn Hills, Mich. Accordingly, the disclosed invention is particularly well suited for creating the secured cargo area 12 in Jeep® convertible vehicles.

Figure 7:
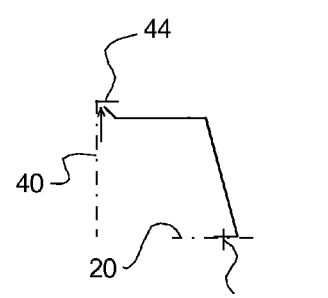
FIG. 7 is a view of the embodiment illustrated in FIG. 4, the view taken as if looking towards the vehicle from the passenger's (right) side.
Figure 8:
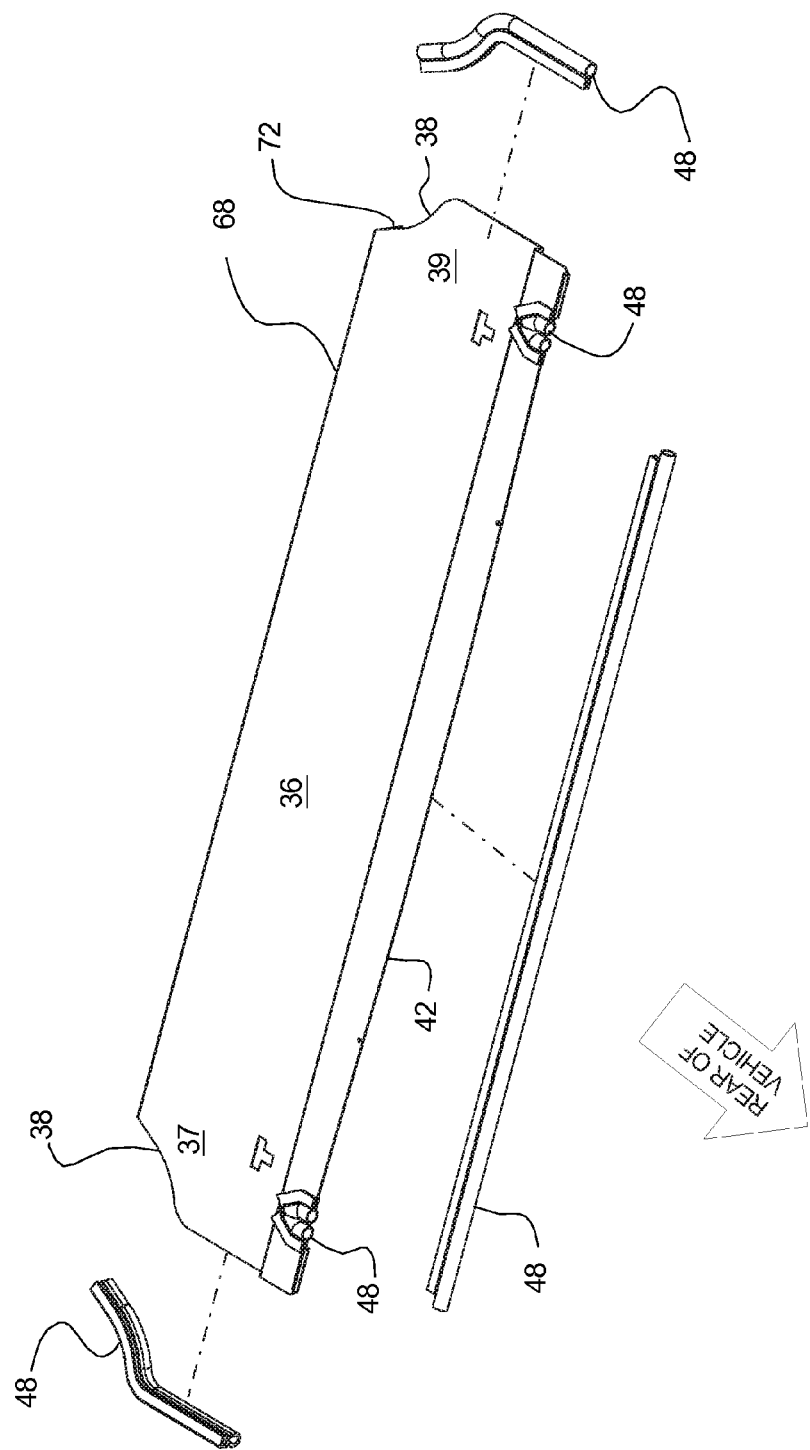
FIG. 8 is perspective view of a highly preferred example of the top panel of the disclosed invention.

Turning now to FIGS. 2 and 7, it will be understood that the tailgate flange 46 will extend directly over the aft edge 42 of the deck panel 36 when the vehicle's tailgate 40 is in the closed position. In a preferred example of the invention, illustrated in FIGS. 8 and 12, a resilient rubber edge trim 48 that is used to create a close fit between the deck panel 36 and the tailgate 40 and the sport cage uprights 30. The resilient rubber edge trim 48 will assist in achieving a close fit between the deck 36 and the adjacent structure found in the cargo area 14.

The close fit of the deck panel 36 between the tailgate 40, the aft end 49 of the vehicle 16, and the sport cage uprights 30 prevent forward and aft movement of the deck panel 36 relative to the vehicle 16. While it is contemplated that forward movement of the deck panel 36 relative to the vehicle 36 can be achieved by attaching the deck panel 36 to the generally planar front panel 50, which is in-turn fastened to the floor 20 of the cargo area 14, sole reliance on such an attachment would allow a thief to simply bend the planar front panel 50 towards the front of the vehicle in order to attempt to move the deck panel 36 out from under the flange 44, which would allow the thief to lift the deck panel 36 and gain access to the enclosure area 12. Accordingly, the cooperation of the sport cage upright abutment edge 38 and the sport cage uprights 30 prevent forward movement of the deck panel and thus prevents thieves from gaining access to the enclosure area 12. This added security function is accomplished without having to drill holes into the vehicle to fasten the deck panel to angles or brackets that in turn attach to the cargo area 14.

Figure 5:
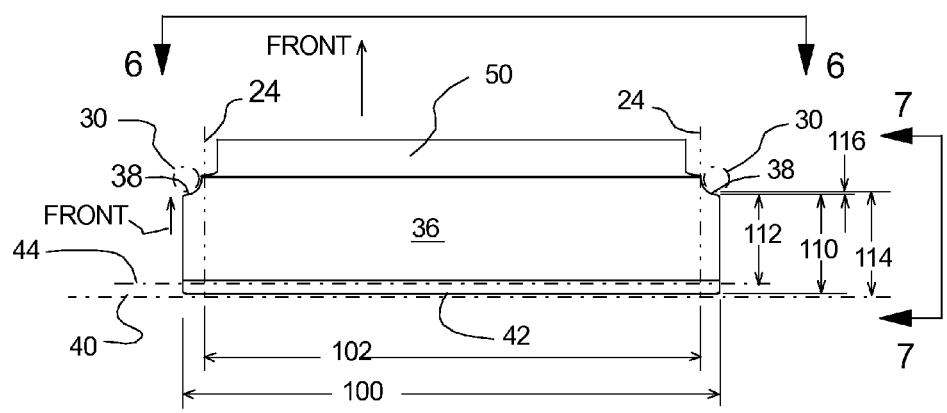
FIG. 5 is a view of the embodiment illustrated in FIG. 4, the view taken looking down at the device, as if the device were mounted in a vehicle.
Figure 6:
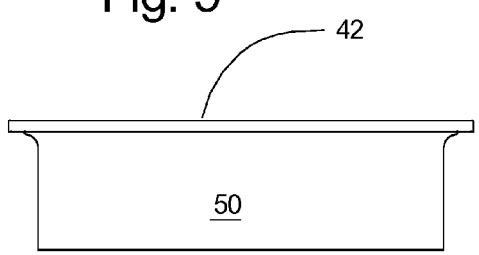
FIG. 6 is a view looking aft at the embodiment illustrated in FIG. 4.

Referring now to FIG. 5, which further illustrates the disclosed arrangement and cooperation of the deck panel 36 and the components that are found in stock Jeep® Wrangler® convertible vehicles. In order to create the secure enclosure area 12, FIG. 5 illustrates that the deck panel width 100 is greater than the enclosure area width 102, which is between the sides 24 of the wheel wells 22. This difference in width results in the deck panel 36 being supported from the upper surfaces 34 of both of the wheel wells 22. Thus the disclosed invention takes advantage of the fact that the sport cage uprights 30 are also mounted from the upper surfaces 34 of the wheel wells 22, as illustrated in FIGS. 1 and 2. This allows the invention to use the upper surfaces 34 to support the deck panel 36 while positioning the abutment edges 38 at a location that is immediately next to the sport cage uprights 30, and thus support and restrict movement of the deck panel 36.

Still further, as shown on FIG. 1, it is contemplated that the sport cage uprights 30 may be fastened to the wheel wells 22 with bolts 45 or other mechanical fasteners. It is contemplated that the disclosed invention may take advantage of existing fasteners or other OEM installed structure or discontinuity to secure the deck panel 36 to the vehicle.

FIG. 5 also shows that the distance 110 from the abutment edge 38 to the aft edge 42 of the deck panel 36 is greater than the distance 112 between the upright 30 and the flange 44 but less than the distance 114 from the upright 30 and the tailgate 40. Thus, the difference between the distance 110 from the abutment edge 38 to the aft edge 42 and the distance 114 between the upright 30 and the tailgate 40 serve to capture the deck panel 36 between the flange 44 and the upright 30. Accordingly, the distance 116 between the abutment edge 38 and the upright 30 should be smaller than the length of the flange 44 or lip 26.

Turning now to FIGS. 2, 4, 6, and 8-12, it will be further understood how the planar front panel 50 is designed for attachment to the floor 20. Preferably, this attachment is accomplished using the attachment points 52 that are used by the manufacturer to mount accessories commonly supplied by the manufacturer. This includes items such as the rear seat 28 that includes faster holes and other hardware that allow the rear seat 28 to be fastened to the floor 20. Additionally, the Jeep® convertibles are like to provide tie-down bolts 53 or other that have fasteners that attach to the floor 20 or cargo area 14.

Because of possible vehicle model and year-to-year changes in the seat mounting locations, the front panel 50 of the disclosed invention can be modified to use mounting brackets 54 that will use threaded fasteners 53 to connect the front panel 50 to the seat belt attachment points 52, and thus allow the front panel 50 to share a variety of fastening or attachment points 52 provided by the manufacturer for the rear seat 28 regardless of year to year variations in fasteners or fastener locations.

Figure 9:
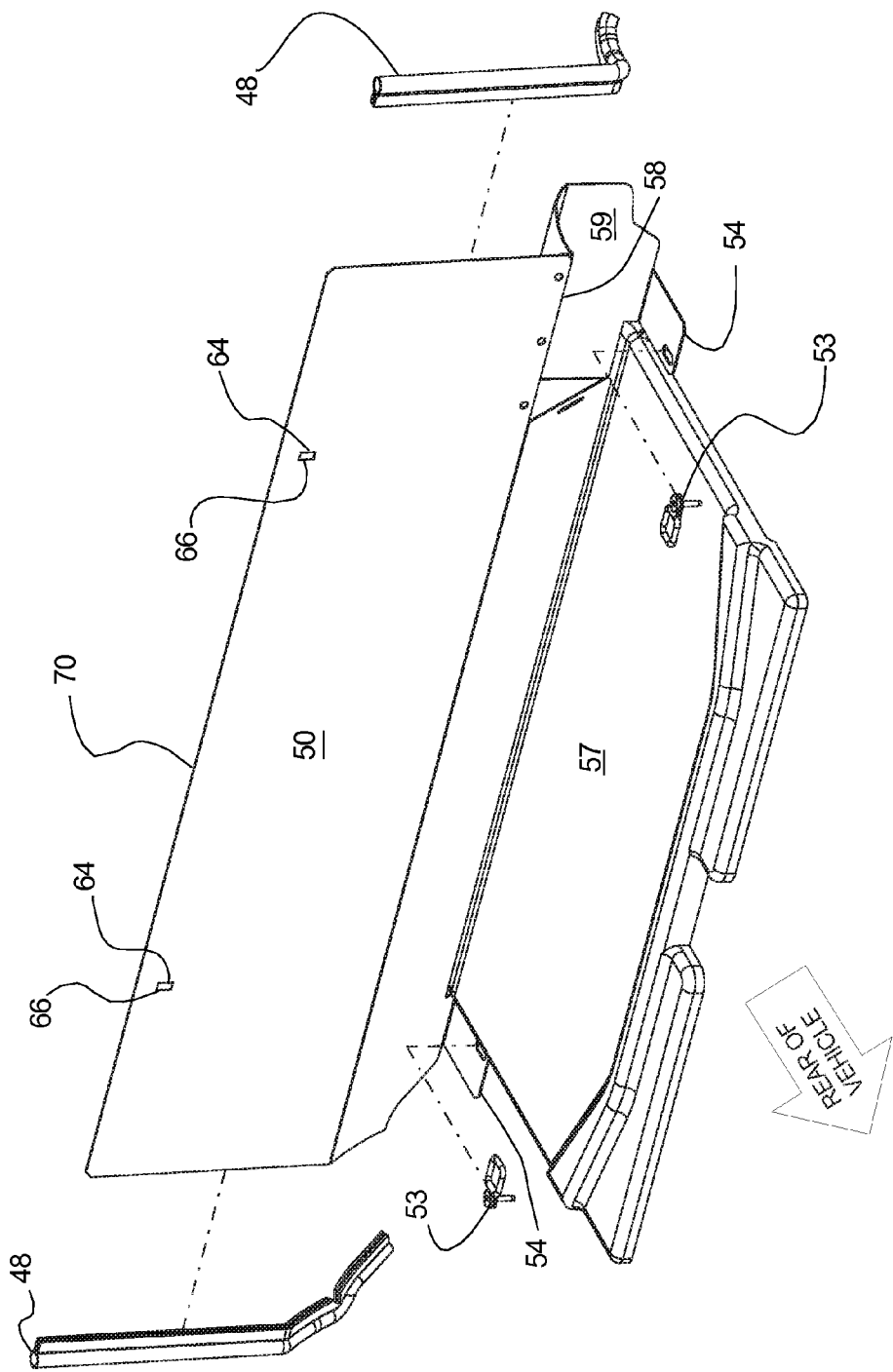
FIG. 9 is perspective view of a highly preferred example of the front panel of the disclosed invention, the example including cover plate for accommodating a subwoofer that is found on some Jeep® Wrangler® convertible vehicles.
Figure 10:
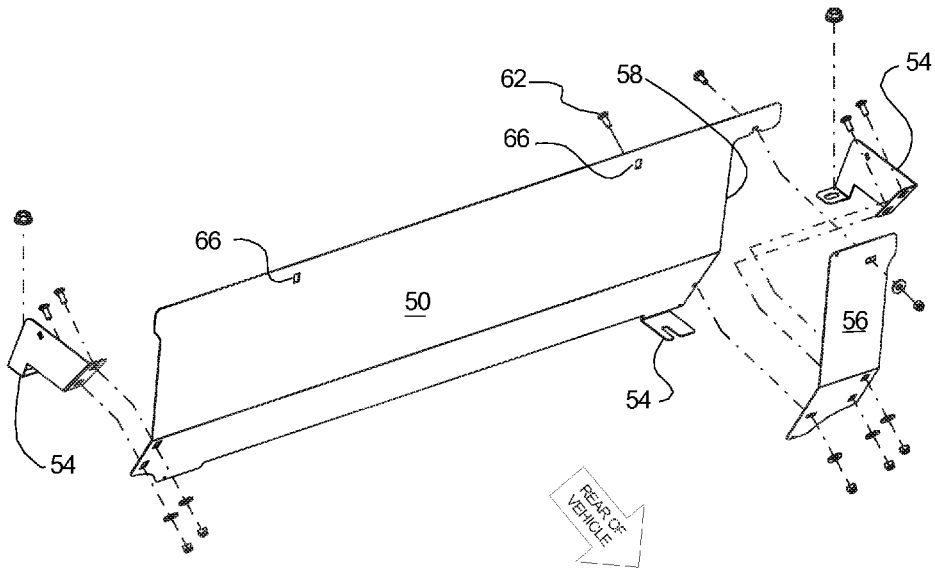
FIG. 10 is a perspective view of an example of the front panel, the example including a removable extension plate that is used to cover the slot that is used for accommodating the housing for a manufacturer-installed subwoofer.
Figure 11:
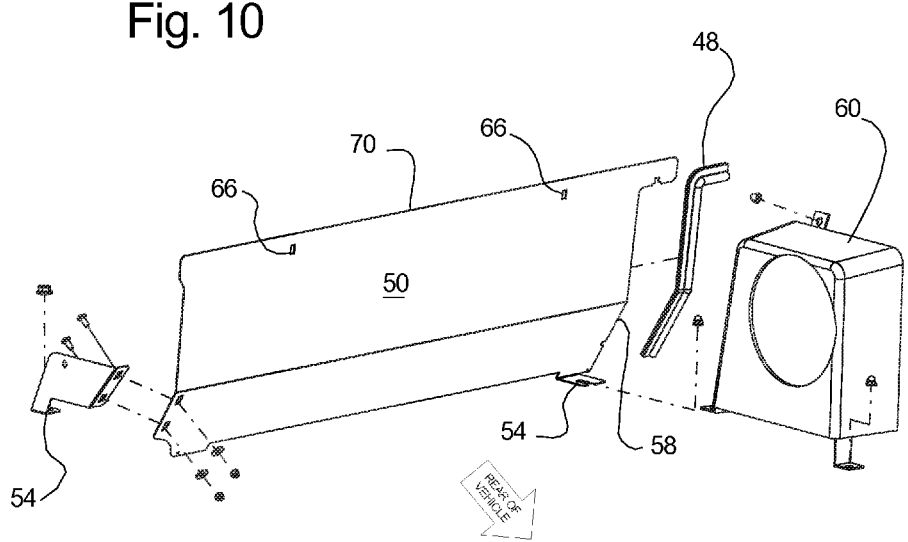
FIG. 11 is a perspective view of the example as illustrated in FIG. 10, with the extension plate removed in order to accommodate a subwoofer housing.

Referring now to FIGS. 9-12, it will be understood that a common variation in the structure found installed in various models of Jeep® convertibles is the addition of a factory installed subwoofer enclosure 60, which has been illustrated in FIG. 11. In order to allow for this variation, a preferred embodiment of the invention incorporates a removable extension plate 56 that can be removed by the installer in order to create a subwoofer slot 58 on the front panel 50. The subwoofer slot 58 is used to accommodate a subwoofer cover plate 59 that accommodates the subwoofer enclosure 60, installed by the manufacturer. It should be noted that the example shown in FIG. 9 is shown with the invention as it extends over a factory access panel 57. The access plate 57 covers an original equipment storage bin found in the Jeep® Wrangler®, which will be enclosed within the enclosure area 12 created by the disclosed invention.

Figure 12:
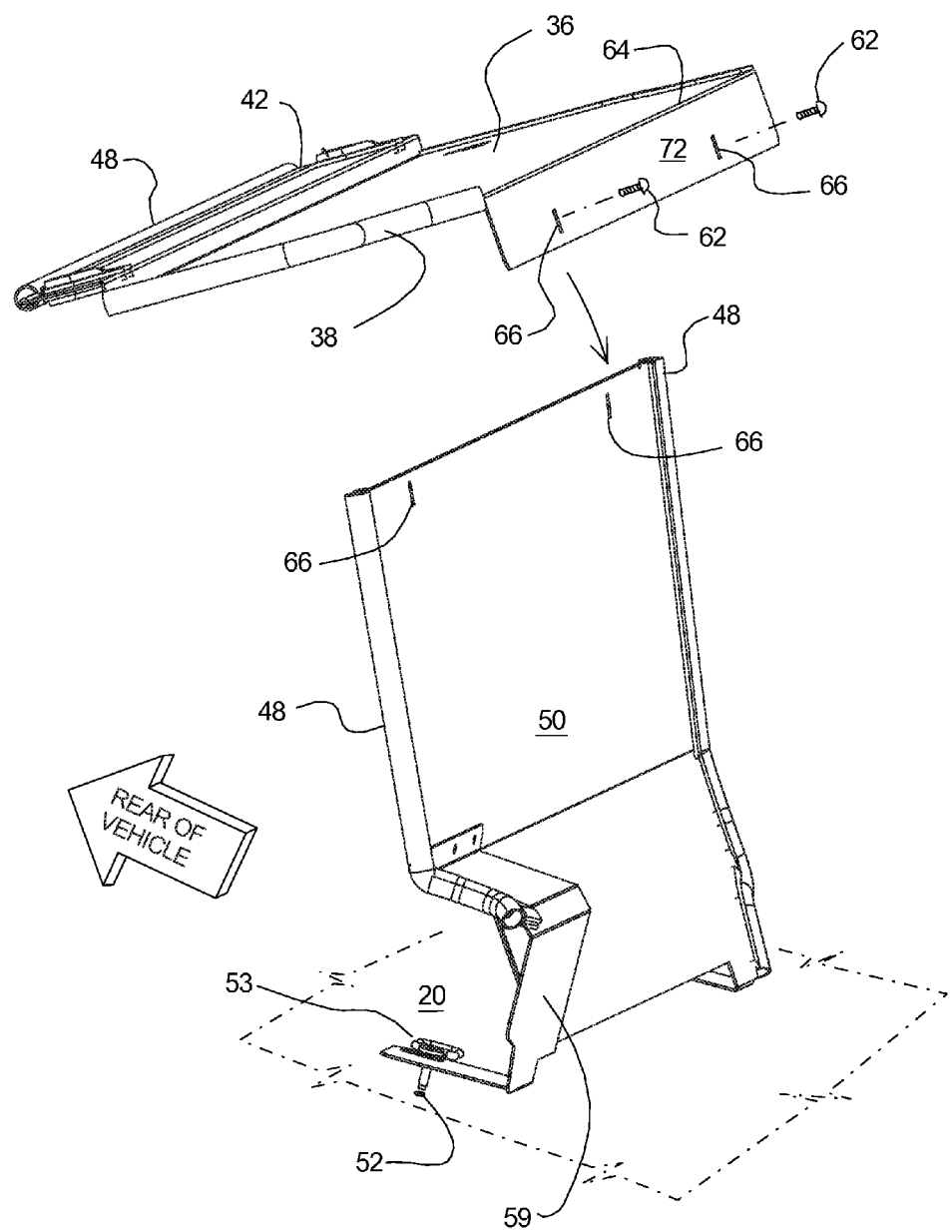
FIG. 12 is a perspective view illustrating the mounting of the deck panel on to the front panel prior to fastening the two with carriage bolts.
Figure 13:
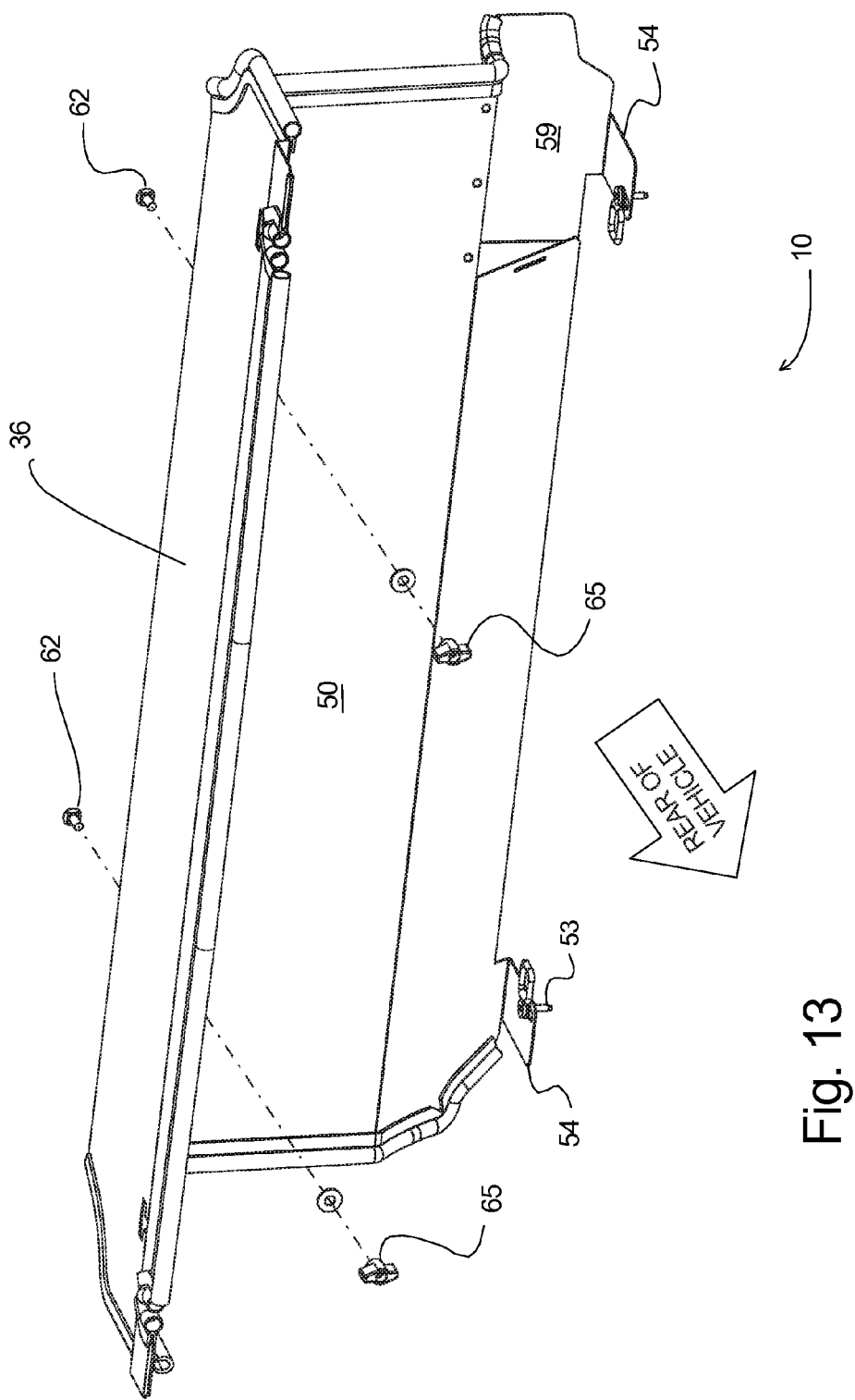
FIG. 13 is a perspective view of the disclosed invention with the subwoofer cover plate attached.

Referring now to FIGS. 2, 12 and 13, it will be understood that in a preferred example of the invention the deck panel 36 and the front panel 50 will be shipped from the manufacturer as two separate pieces, instead of as a one-piece assembly as shown in FIGS. 4-7. The deck panel 36 and the front panel 50 are manufactured as separate pieces in order to facilitate installation and shipping of the disclosed invention. The end user or installer will then fasten the deck panel 36 and the front panel 50 together while installing the invention in the vehicle. FIGS. 2 and 12 show that when installing the deck panel 36 and the front panel 50 is re-joined through a lap joint 63 that is secured with carriage bolts 62, and mating wing nuts 65, which are shown on FIG. 13. The carriage bolts 62 extend through slotted apertures 66, which preferably extend through both the front panel 50 and a lap joint flange 72. The use of the slotted aperture 66 will allow the adjustment of the overall distance between the deck panel 36 and the seat attachment points 52, and thus accommodate differences found in different models or production variances in the Jeep® Wrangler® type convertible as well as accommodate manufacturing tolerances. Still further, the use of carriage bolts 62 will provide the desired adjustability and preserving the ability of providing a secure storage compartment due to fact that the rounded heads that are found on the carriage bolts 62 prevent removal of these bolts.

It will be understood from FIGS. 2, 5, and 12 that the disclosed invention creates a secure, tight fitting arrangement, which can keep dust, rain, and thieves out of the enclosure area. In order to create such a tight fitting arrangement the deck panel 36 must be sized so as to create a tight fit between the aft end 25 or tailgate 40 and the sport cage uprights 30. Additionally, the disclosed invention must also be able to prevent access to the enclosure area from the front edge 64 of the deck panel 36, a feature that is achieved through the use of the front panel 50.

It is contemplated that important benefits associated with the disclosed invention can be obtained by making the disclosed invention as a unitary device of one-piece construction. However, such an arrangement would suffer from the disadvantages associated with the work required to remove the entire device in the event that the user needs to carry a large item that can only be fit into the vehicle if the deck panel 36 is removed. Additionally, making the disclosed invention as a unitary device of one-piece construction would require that the device be shipped in a larger container than needed for the two-piece arrangement of the preferred embodiment.

Still further, the disclosed invention would be more difficult to install if were manufactured of one-piece construction, as illustrated in FIGS. 4-7. By first studying the embodiment illustrated in FIG. 4, and then envisioning the sequence of steps required for installing the invention, one can appreciate the difficulties associated with a one-piece construction version of the disclosed invention. First, assuming that the vehicle floor has fastener locations that would make fastening of the front panel 50 to the floor 20, one would still be left with the problems associated with simultaneously fitting the deck panel 36 and the front panel 50 between the aft end 25 and the sport cage uprights 30. Then, the user would have to install several fasteners that are found within the enclosure area, a task that would have to be done through the tailgate, since the deck panel 36 will prevent access to the fasteners within the enclosure area 12.

Accordingly, another aspect disclosed here is a method for creating an enclosure device for forming a secured enclosure area within a cargo area 14. The method includes separating the device into the deck panel 36 and the front panel 50, and providing a lap joint 63 arrangement that facilitates the installation and fastening of the front panel 50 to the floor 20 or other factory installed features found in the vehicle. Once the front panel 50 has been securely installed, then the deck panel can be installed between the sport cage risers 30, and fastened to the front panel 50 using the carriage bolts 62 though the slotted apertures 66 and mating wing-nuts 65.

Still further, the manufacture of the disclosed invention as two parts, such as the example shown on FIG. 12, will also allow easy removal of the deck panel 36 from the front panel 50 in order to allow the user to carry tall items in the cargo area 14. An added benefit of the two part construction is that the deck panel 36 can nest within the front panel 50, and can thus be shipped to users in smaller containers.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. An enclosure device for forming a secured enclosure area within a cargo area of a vehicle, the vehicle having a sport cage, the cargo area having a floor between a pair of wheel wells that have an upper surface that supports at least a portion of the sport cage, the support of the sport cage creating a discontinuity along the upper surface of the wheel wells, the wheel wells including sidewalls that extend up from the floor, the cargo area further having a tailgate that is moveable between an open position that provides access to the floor of the cargo area, and a closed position where the tailgate is generally normal to the sidewalls and the floor, and the cargo area further having an aft end with an upper lip that extends over at least a portion of the upper surface of the wheel wells, the enclosure device comprising:
   a front panel, the front panel being adapted for extending between the wheel well sides and next to the floor of the cargo area, the front panel further being adapted for attachment to the vehicle;
   a generally planar deck panel that is attached to the front panel, the deck panel having:
      a pair of spaced apart left and right sides that are adapted for extending over the wheel wells while the deck panel extends between the sidewalls;
   the left and right sides each further having an aft edge, the aft edge being adapted for extending to a location directly below the upper lip of the aft end of the cargo area when the front panel is attached to the vehicle; and
   an abutment edge extending from at least one of spaced apart left and right sides, the abutment edge being at a distance from the aft edge such that the abutment edge is positioned next to the discontinuity and over the upper surface of the wheel well, below the upper lip of the aft end of the cargo area, and between the discontinuity and the aft end of the cargo area when the aft edge is directly below the upper lip of the aft end of the cargo area, so that access to the cargo area below the deck panel is closed when the tailgate is in the closed position along the aft end, whereby a forward movement of the deck panel that allows the aft edge of the deck panel to be removed from below the upper lip is prevented by contact of the abutment edge against the discontinuity.

2. An enclosure device according to claim 1 wherein said front panel extends from the floor in a generally non-perpendicular fashion to the floor when the front panel is fastened to the floor.

3. An enclosure device according to claim 1 wherein said deck panel is at least partially supported from the wheel wells.

4. An enclosure device according to claim 3 wherein said deck panel is connected to the front panel through a lap joint that allows adjustment of the attachment of the deck panel relative to the front panel, so that the deck panel may lay flat against the upper surface of the wheel wells.

5. An enclosure device according to claim 2 wherein said front panel further comprises an upper section with at least two front panel apertures near the upper edge and said forward edge of said deck panel further includes a flange that extends from the forward edge of the deck panel, the flange includes a pair of flange apertures that are adapted for aligning with the two front panel apertures, so that the flange may be fastened to the front panel, and so that installation of the enclosure device may be carried out by first installing the front panel and then attaching the deck panel to the front panel.

6. An enclosure device according to claim 1 wherein the planar deck panel is removably connected to the rectangular front panel.

7. An enclosure device for forming a secured enclosure area within a cargo area of a vehicle, the cargo area further having a floor between a pair of wheel wells, each of the wheel wells having wheel well opposing sidewalls that extend upwards from the floor and end in wheel well upper surfaces that are generally parallel to the floor, the cargo area being accessible through a planar tailgate that provides access through an end wall that extends between the two opposing sidewalls, the end wall terminating in an upper lip that extends directly above at least a portion of the upper surfaces of the wheel wells, the vehicle further having a sport cage having at least two upright members, each of the upright members being attached to one of the wheel well upper surfaces at a distance from the end wall, each of the upright members extending upward from the respective wheel wells, the enclosure device comprising:
- a generally rectangular front panel, the front panel being of a width adapted for having the rectangular front panel extend between the wheel well sides, the front panel further having a lower section that has been adapted for attachment to the vehicle; and
- the rectangular front panel further having an upper section that is adapted for extending upwards from the lower section, the upper section including an upper edge;
- a generally planar deck panel, the deck panel having:
  - a forward edge that is adapted for attachment to the upper edge of the front panel;
  - a pair of spaced apart left and right sides that are adapted for extending over the upper surfaces of the wheel wells and the sidewalls;
  - an aft edge that is generally parallel to the forward edge and being adapted for extending to a location directly below the upper lip of the aft end; and
  - a sport cage upright abutment edge between the forward edge and the aft edge, the sport cage abutment edge extending from one of the spaced apart sides, the sport cage abutment edge being adapted for extending over the upper surfaces of the wheel wells, between one of the uprights and below the upper lip of the aft end and next to one of the upright members while spaced apart sides are positioned on the wheel well upper surface, while the aft edge of the deck panel is directly below the upper lip, whereby a forward movement of the deck panel that allows the aft edge of the deck panel to be removed from below the upper lip is prevented by contact of the abutment edge against the upright member;

so that the abutment edge remains positioned between the sport cage upright member, and below the upper lip, and over the upper surfaces of the wheel wells when the deck panel is positioned against the wheel well upper surfaces, and so that the cargo area below the deck panel is closed when the tailgate is in a closed position, extending across the cargo area.

8. An enclosure device according to claim 7 wherein said front panel extends from the floor in a generally non-perpendicular fashion when the front panel is fastened to the floor.

9. An enclosure device according to claim 8 wherein the upper section of said front panel further comprises at least two front panel apertures near the upper edge and said forward edge of said deck panel further includes a flange that extends from the forward edge of the deck panel, the flange includes a pair of flange apertures that are adapted for aligning with the two front panel apertures, so that the flange may be fastened to the front panel, and so that installation of the enclosure device may be carried out by first installing the front panel and then attaching the deck panel to the front panel.

* * * * *